(12) United States Patent
Watanabe

(10) Patent No.: US 10,875,136 B2
(45) Date of Patent: Dec. 29, 2020

(54) MACHINE TOOL SYSTEM AND CLAMPING METHOD

(71) Applicant: FANUC CORPORATION, Yamanashi (JP)

(72) Inventor: Rikizou Watanabe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 331 days.

(21) Appl. No.: 15/933,448

(22) Filed: Mar. 23, 2018

(65) Prior Publication Data

US 2018/0272487 A1 Sep. 27, 2018

(30) Foreign Application Priority Data

Mar. 27, 2017 (JP) ................................. 2017-060554

(51) Int. Cl.
| | |
|---|---|
| *B23Q 7/04* | (2006.01) |
| *B25J 9/00* | (2006.01) |
| *B25J 9/16* | (2006.01) |
| *B25J 11/00* | (2006.01) |
| *B25J 19/02* | (2006.01) |
| *B25J 15/00* | (2006.01) |
| *B23Q 11/08* | (2006.01) |

(52) U.S. Cl.
CPC ............ *B23Q 7/047* (2013.01); *B25J 9/0096* (2013.01); *B25J 9/1612* (2013.01); *B25J 9/1679* (2013.01); *B25J 11/005* (2013.01); *B25J 15/0038* (2013.01); *B25J 19/02* (2013.01); *B23Q 11/0891* (2013.01); *B23Q 2220/002* (2013.01); *G05B 2219/39105* (2013.01)

(58) Field of Classification Search
CPC ............... B23Q 7/047; B23Q 11/0891; B23Q 2220/002; B25J 9/1679; B25J 9/1612; B25J 11/005; B25J 19/02; B25J 15/0038; B25J 9/0096; G05B 2219/39105
See application file for complete search history.

(56) References Cited

U.S. PATENT DOCUMENTS

| | | | |
|---|---|---|---|
| 5,056,964 A | 10/1991 | Naka et al. | |
| 5,781,983 A * | 7/1998 | Gruner | ................... B23Q 7/047 29/563 |
| 2009/0013790 A1 | 1/2009 | Roders | |

(Continued)

FOREIGN PATENT DOCUMENTS

| | | |
|---|---|---|
| JP | 01-193153 A | 8/1989 |
| JP | 04-159055 A | 6/1992 |

(Continued)

OTHER PUBLICATIONS

English Abstract and Machine Translation for Japanese Publication No. 04-159055 A, published Jun. 2, 1992, 5 pages.

(Continued)

*Primary Examiner* — Stephen Holwerda
(74) *Attorney, Agent, or Firm* — Fredrikson & Byron, P.A.

(57) ABSTRACT

A machine tool system includes: a machine tool for machining a workpiece set on a table using a tool attached to a spindle; and a robot for gripping the workpiece. The robot is installed on the table and performs a setting operation for setting the workpiece on the table and a clamping operation for clamping the workpiece.

10 Claims, 6 Drawing Sheets

(56) References Cited

U.S. PATENT DOCUMENTS

| | | | |
|---|---|---|---|
| 2010/0010662 A1* | 1/2010 | Inagaki | B23Q 11/0039 700/175 |
| 2010/0164156 A1* | 7/2010 | Bretschneider | B23Q 17/005 269/86 |
| 2011/0288677 A1 | 11/2011 | Meidar et al. | |
| 2012/0243952 A1 | 9/2012 | Kuo et al. | |
| 2014/0216216 A1* | 8/2014 | Hessenkamper | B23B 29/125 82/1.11 |
| 2015/0190896 A1 | 7/2015 | Tanaka | |
| 2015/0308177 A1 | 10/2015 | Oda | |
| 2016/0325400 A1 | 11/2016 | Murakami et al. | |
| 2016/0332273 A1* | 11/2016 | Furuya | B23Q 17/0966 |
| 2017/0043439 A1* | 2/2017 | Naitou | B23Q 3/069 |
| 2017/0050282 A1* | 2/2017 | Kruck | B23Q 1/66 |
| 2017/0087676 A1* | 3/2017 | Matake | B25J 13/085 |
| 2018/0104826 A1* | 4/2018 | Kunisaki | B25J 15/0095 |

FOREIGN PATENT DOCUMENTS

| | | |
|---|---|---|
| JP | 05-301142 A | 11/1993 |
| JP | 06-344033 A | 12/1994 |
| JP | 08-152911 A | 6/1996 |
| JP | 2000-210840 A | 8/2000 |
| JP | 2008-540146 A | 11/2008 |
| JP | 2012-200858 A | 10/2012 |
| JP | 2015-112658 A | 6/2015 |
| JP | 2015209658 A | 11/2015 |
| JP | 2016-052692 A | 4/2016 |
| JP | 5940712 B1 | 6/2016 |
| WO | 2014/002250 A1 | 1/2014 |

OTHER PUBLICATIONS

English Abstract for Japanese Publication No. 2015-112658 A, published Jun. 22, 2015, 1 page.

English Abstract for Japanese Publication No. 01-193153 A, published Aug. 3, 1989, 2 pages English Abstract and Machine Translation for Japanese Publication No. 2016-052692 A, published Apr. 14, 2016, 12 pages.

English Abstract for Japanese Publication No. 2012-200858 A, published Oct. 22, 2012, 2 pages.

English Abstract and Machine Translation for Japanese Publication No. 05-301142 A, published Nov. 16, 1993, 6 pages.

English Abstract and Machine Translation for Japanese Publication No. 06-344033 A, published Dec. 20, 1994, 6 pages.

English Abstract and Machine Translation for Japanese Publication No. 08-152911 A, published Jun. 11, 1996, 6 pages.

English Abstract and Machine Translation for Japanese Publication No. 2000-210840 A, published Aug. 2, 2000, 8 pages.

English Abstract and Machine Translation for Japanese Publication No. 2008-540146 A, published Nov. 20, 2008, 8 pages.

English Abstract and Machine Translation for Japanese Publication No. 5940712 B1, published Jun. 29, 2016, 8 pgs.

English Abstract for Japanese Publication No. 2015209658 A, published Nov. 24, 2015, 2 pgs.

\* cited by examiner

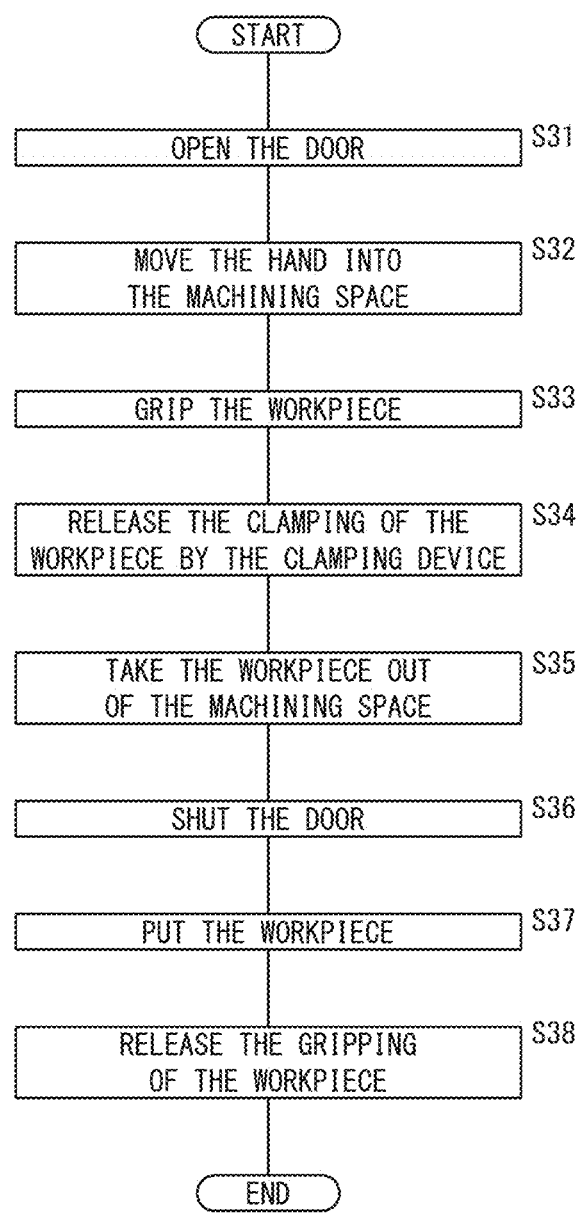

MACHINE TOOL SYSTEM AND CLAMPING METHOD

CROSS-REFERENCE TO RELATED APPLICATION

This application is based upon and claims the benefit of priority from Japanese Patent Application No. 2017-060554 filed on Mar. 27, 2017, the contents of which are incorporated herein by reference.

BACKGROUND OF THE INVENTION

Field of the Invention

The present invention relates to a machine tool system having a clamping function for clamping a workpiece, as well as a clamping method.

Description of the Related Art

Japanese Laid-Open Patent Publication No. 2015-209658 discloses a configuration in which an articulated robot arranged outside a processing machine is used to load a blank workpiece into a processing machine and unload the finished workpiece out of the processing machine.

SUMMARY OF THE INVENTION

However, in the configuration described in Japanese Laid-Open Patent Publication No. 2015-209658, the workpiece has to be fixed (clamped) by a clamping device installed on the table after the workpiece is carried into the machining space. Further, when the clamping device is used, it is necessary to use a sensor or the like to confirm that the workpiece has been correctly clamped. Moreover, when unloading the machined workpiece to the outside of the processing machine, it is necessary to release (unclamp) the workpiece fixed by the clamp device. Thus, the clamping and unclamping by the clamping device ends up increasing the time of the machining cycle.

It is therefore an object of the present invention to provide a machine tool system and a clamping method for preventing the clamping and unclamping operations of a clamping device from prolonging the machining cycle.

According to the first aspect of the present invention, a machine tool system includes: a machine tool configured to machine a workpiece set on a table using a tool attached to a spindle; and a robot configured to grip the workpiece, and is constructed such that the robot is installed on the table and configured to perform a setting operation for setting the workpiece on the table and a clamping operation for clamping the workpiece.

According to the second aspect of the present invention, a clamping method for clamping a workpiece on a table of a machine tool machining the workpiece with a tool attached to a spindle, includes the steps of: installing on the table a robot that grips the workpiece; performing a setting operation of setting the workpiece on the table with the robot; and performing a clamping operation of clamping the workpiece with the robot.

According to the present invention, there is no need to provide a clamp device. Accordingly, it is no longer necessary to perform a clamping operation with a clamping device or confirm the clamped state, whereby the machining cycle time can be shortened. Also, since there is no need to provide a clamp device, it is not necessary to perform an unclamping operation. Furthermore, even if the table is moved, the clamping accuracy of the workpiece will not deteriorate. Also, since the robot is installed in the machining space, there is no need to provide a safety fence surrounding the robot, whereby the cost is reduced.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a flowchart showing the operations from the end of machining to the unloading of the workpiece out of the machining space when the conventional robot arranged outside the machining space is used.

DESCRIPTION OF THE PREFERRED EMBODIMENTS

A machine tool system and a clamping method according to the present invention will be detailed hereinbelow by describing preferred embodiments with reference to the accompanying drawings.

Figure 1:
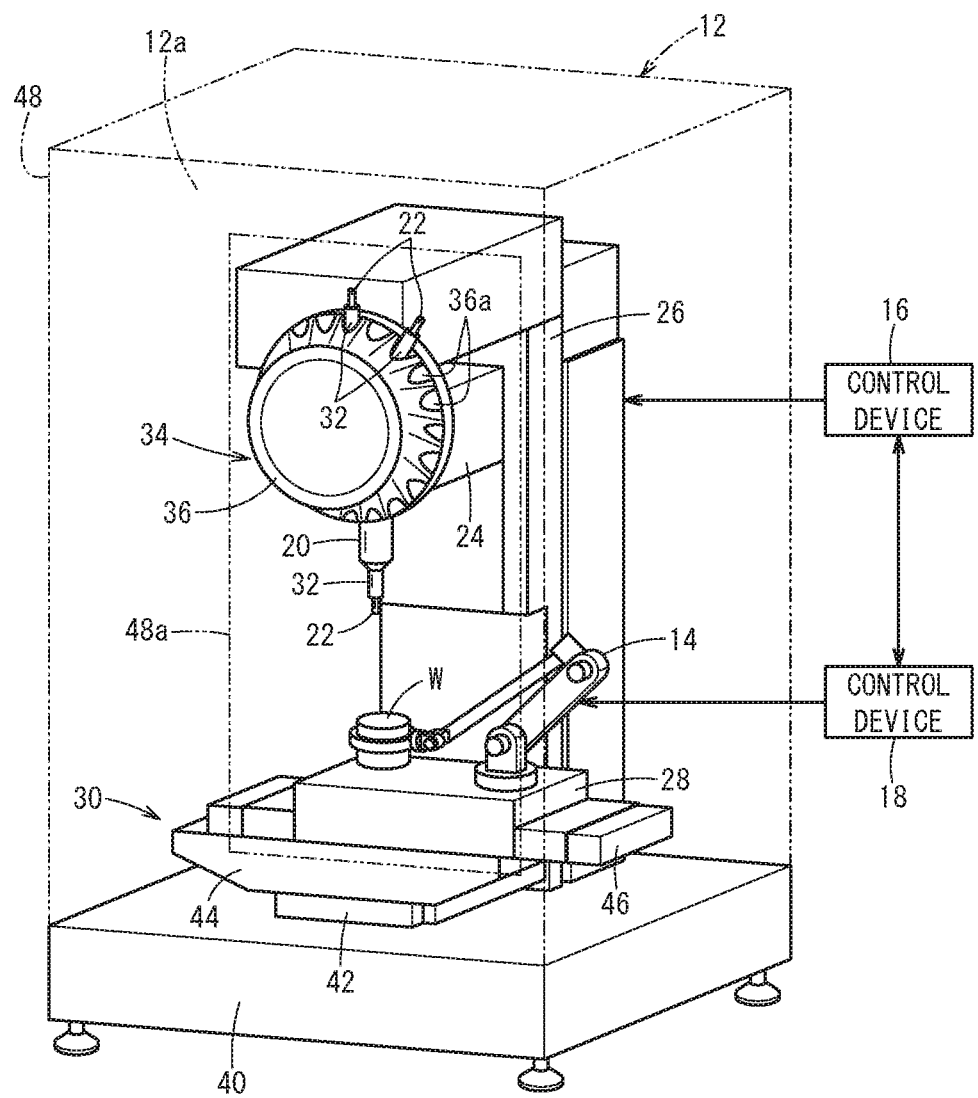
FIG. 1 is a diagram showing a configuration of a machine tool system according to an embodiment.
Figure 2:
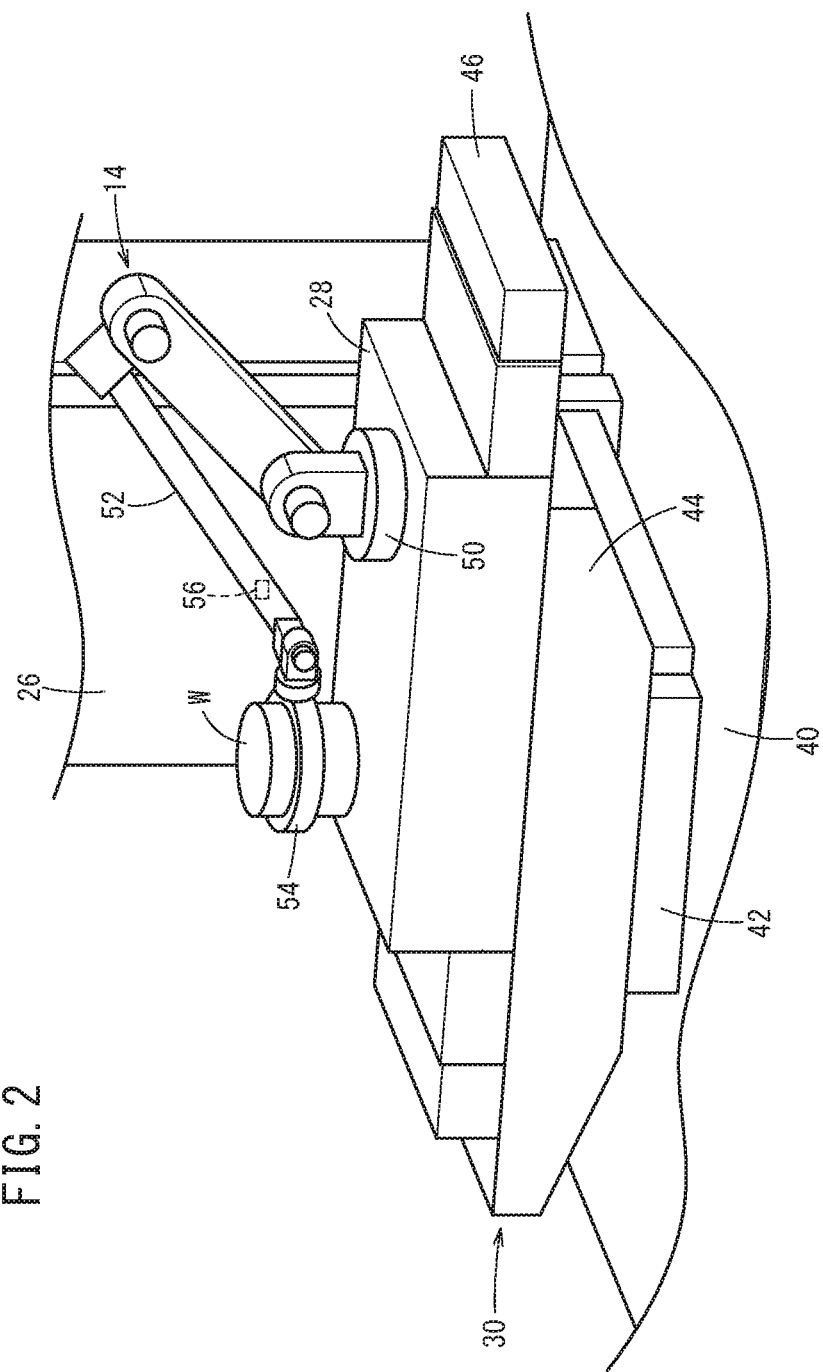
FIG. 2 is an enlarged view of a main part of FIG. 1.

FIG. 1 is a diagram showing a configuration of a machine tool system 10 according to an embodiment, and FIG. 2 is an enlarged view of a main part of FIG. 1. The machine tool system 10 includes a machine tool 12, a robot 14, a control device 16 for controlling the machine tool 12, and a control device 18 for controlling the robot 14. The control device 16 and the control device 18 can communicate with each other. The control device 16 and the control device 18 may be a single controller.

The machine tool 12 machines a target object to be machined (which will be referred to, hereinbelow, as a workpiece W) with a tool (cutting tool) 22 attached to a spindle 20. The machine tool 12 includes: the spindle 20; a spindle head 24 for rotationally driving the spindle 20 about a rotary axis parallel to the Z-direction; a column 26 for moving the spindle head 24 in the Z-direction (vertical direction); a table 28 arranged under the spindle 20 (on the negative Z-direction side) to support a workpiece W; and a table driver 30 for moving the table 28 in the X-direction and the Y-direction. Here, it is assumed that the X-direction, the Y-direction and the Z-direction are ideally orthogonal to each other. According to the movement of the spindle 20 in the Z-direction and the movement of the table 28 in the X- and Y-directions, the machine tool 12 can machine the workpiece W three-dimensionally. Here, the gravity acts in the negative Z-direction.

The tool 22 is held by a tool holder 32. The tool holder 32 is attachable to and detachable from the spindle 20, so that the tool 22 is attached to the spindle 20 via the tool holder 32. By inserting the tool holder 32 into a mounting hole (not shown) formed at the tip of the spindle 20, the tool 22 is attached to the spindle 20. The tool 22 rotates together with the spindle 20.

The machine tool 12 is configured as a machining center in which the tool 22 attached to the spindle 20 can be replaced by an automatic tool changer 34. The automatic tool changer 34 has a turret tool magazine 36. The tool magazine 36 has a plurality of grips 36a arranged along the circumferential direction. Each of the multiple grips 36a removably holds a tool 22 via the tool holder 32. Examples of the tool 22 may include a heel tool, a drill, an end mill, a milling cutter and the like.

Coupled to the spindle head 24 is an unillustrated Z-axis driving mechanism for moving the spindle head 24 relative to the column 26 in the Z-axis direction parallel to the Z-direction. The Z-axis driving mechanism has a servomotor and a power conversion mechanism (ball screw, nut, etc.) for converting the rotational motion of the servomotor into linear motion and transmitting the motion to the spindle head 24. Further, the spindle 20 is rotated about the Z-axis by the drive of an unillustrated spindle motor installed in the spindle head 24. Further, the tool magazine 36 is rotated (turned) by an unillustrated turning motor.

The table driver 30 is supported by a base 40 or peripheral components of the base 40, and includes a Y-axis slider 42, a saddle 44, and an X-axis slider 46. The saddle 44 is supported so as to be movable in the Y-direction with respect to the base 40 via the Y-axis slider 42. The table 28 is supported so as to be movable in the X-direction with respect to the saddle 44 via the X-axis slider 46.

An unillustrated Y-axis driving mechanism for moving the saddle 44 relative to the base 40 in the Y-axis direction parallel to the Y-direction is coupled to the saddle 44. Similarly, an unillustrated X-axis driving mechanism for moving the table 28 relative to the saddle 44 in the X-axis direction parallel to the X-direction is coupled to the table 28. The Y-axis driving mechanism and the X-axis driving mechanism each have a servomotor and a power conversion mechanism (ball screw, nut, etc.) for converting the rotational motion of the servomotor into linear motion and transmitting the motion to the saddle 44 or the table 28. As the Z-axis driving mechanism, the Y-axis driving mechanism, and the X-axis driving mechanism, well-known configurations can be used. The servomotors of the Z-axis driving mechanism, the Y-axis driving mechanism, and the X-axis driving mechanism, the spindle motor, and the turret motor are controlled by the control device 16. The control device 16 controls the motors above in accordance with an unillustrated machine tool program.

The machine tool 12 is equipped with a splash guard (splash cover) 48 that covers a machining space 12a of the machine tool 12 and prevents cutting chips (machining debris) arising during machining and the cutting fluid from scattering around. The machine tool 12 is provided with a nozzle (not shown) that ejects the cutting fluid toward the tool 22 during machining. Though not illustrated, an opening is formed in the splash guard 48, and the splash guard 48 has an openable/closable door 48a for covering the opening. The opening of the splash guard 48 enables the replacement of the workpiece W supported on the table 28. The door 48a in the splash guard 48 is closed during machining and opened at the time of the replacement of the workpiece W. The door 48a is opened and closed by the drive of an unillustrated actuator (motor). The control device 18 controls the driving of the actuator in accordance with the machine tool program.

The robot 14 is installed on the table 28. As shown in FIG. 2, the robot 14 is an articulated robot having a base portion 50 mounted on the top surface of the table 28 and an articulated arm 52 supported on the base portion 50. A hand 54 for gripping the workpiece W is attached to the distal end of the articulated arm 52. The multiple joints of the articulated arm 52 are driven by unillustrated multiple servomotors. The control device 18 controls the multiple servomotors provided for the robot 14 in accordance with a robot program, thereby controlling the posture of the robot 14. The robot 14 sets the workpiece W on the table 28 and clamps the workpiece W. It should be noted that the robot 14 is installed so as not to be movable relative to the table 28.

<Operation of Machine Tool 12 and Robot 14>

Figure 3:
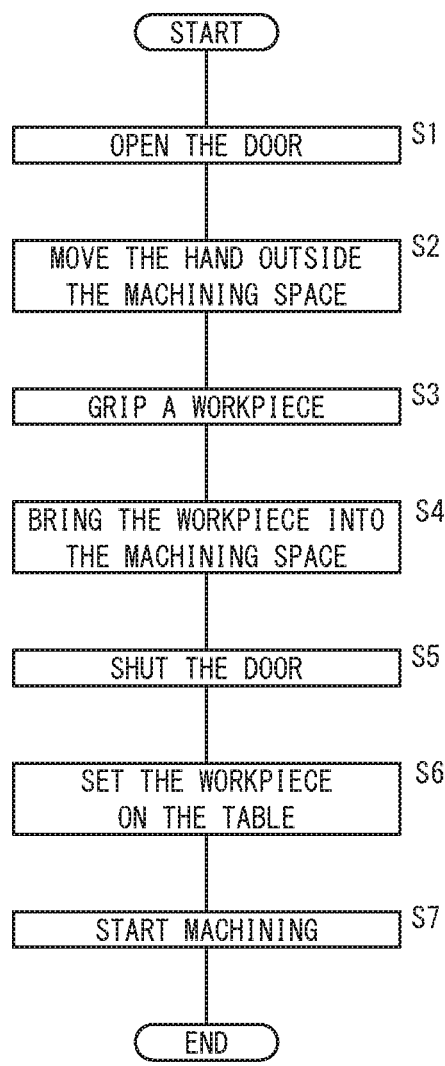
FIG. 3 is a flowchart showing the operations of a machine tool and a robot from the loading of the workpiece into the machining space until the start of machining.

Next, the operation of the machine tool 12 and the robot 14 from the loading of the workpiece W into the machining space 12a to the start of machining will be described with reference to the flowchart shown in FIG. 3. In the following description, the operation of the machine tool 12 and the robot 14 is performed under the control of the control devices 16 and 18, though not particularly described.

First, at step S1, the machine tool 12 opens the door 48a so as to enable the workpiece W to be loaded into the machining space 12a. This exposes the opening formed in the splash guard 48. Next, at step S2, the robot 14 installed on the table 28 moves the hand 54 out of the machining space 12a through the exposed opening.

Next, at step S3, the robot 14 grips a blank workpiece W on a workpiece support table (not shown) arranged outside the machining space 12a with the hand 54. Then, at step S4, the robot 14 takes the gripped workpiece W into the machining space 12a through the opening in the splash guard 48.

When the workpiece W is loaded into the machining space 12a, the machine tool 12 closes the door 48a at step S5. Thus, the opening is covered with the door 48a.

Next, at step S6, the robot 14 places the brought workpiece W on the table 28 and performs a clamping operation to clamp (fix) the workpiece W on the table 28. That is, the robot 14 continues gripping the workpiece W without moving the workpiece W set on the table 28.

The clamping operation is to prevent a machining position on the workpiece W from deviating from one specified by the machine tool program when the machine tool 12 is operated to machine the workpiece W in accordance with the program. Therefore, the workpiece W will not move relative to the table 28 during machining. In addition, since the robot 14 is set on the table 28, the relative position between the robot 14 and the workpiece W and the table 28 will not change either even when the table 28 moves in the X-axis and Y-axis directions. Therefore, moving the table 28 will not lower the accuracy of the clamping of the workpiece W performed by the robot 14.

When the workpiece W is set on the table 28, the machine tool 12 starts machining at step S7.

Figure 4:
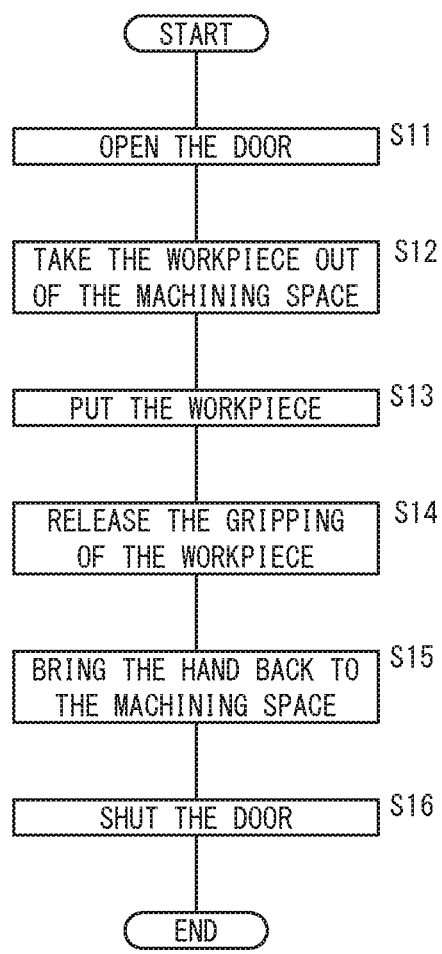
FIG. 4 is a flowchart showing the operations of the machine tool and the robot from the end of machining to the unloading of the workpiece to the outside of the machining space.

Next, the operation of the machine tool 12 and the robot 14 from the completion of machining to the unloading of the workpiece W to the outside of the machining space 12a will be described with reference to the flowchart shown in FIG. 4.

Upon completion of the machining, at step S11, the machine tool 12 opens the door 48a so as to enable the workpiece W unloaded from the machining space 12a. Next, at step S12, the robot 14 takes out the machined workpiece W from the machining space 12a through the opening in the splash guard 48.

Next, at step S13, the robot 14 places the workpiece W on the workpiece support table installed outside the machining space 12a. At step S14, the robot 14 releases the gripping of the workpiece W performed by the hand 54. Next, at step S15, the robot 14 moves the hand 54 back into the machining space 12a through the opening in the splash guard 48.

After the hand 54 moves back to the machining space 12a, at step S16 the machine tool 12 shuts the door 48a. As a result, the opening is enclosed with the door 48a.

In this manner, the robot 14 installed on the table 28 brings the workpiece W from the outside of the machining space 12a thereinto and places the brought workpiece W on the table 28. At this time, the robot 14 continues gripping the workpiece W without moving the workpiece W on the table 28. Accordingly, it is not necessary to perform or confirm the clamping operation of the workpiece W with a clamping device, it is hence possible to reduce the time of the machining cycle. Further, when the machining is completed, the robot 14 on the table 28 only has to take out the workpiece W, so there is no need for a clamping device to perform an unclamp operation, it is hence possible to shorten the time of the machining cycle. Further, since the robot 14 is installed on the table 28, even if the table 28 moves, the accuracy of clamping the workpiece W by the robot 14 will not degrade. In addition, since the robot 14 is installed in the machining space 12a, there is no need to provide a safety fence surrounding the robot 14, whereby the cost is reduced.

<Conventional Operation>

Figure 5:
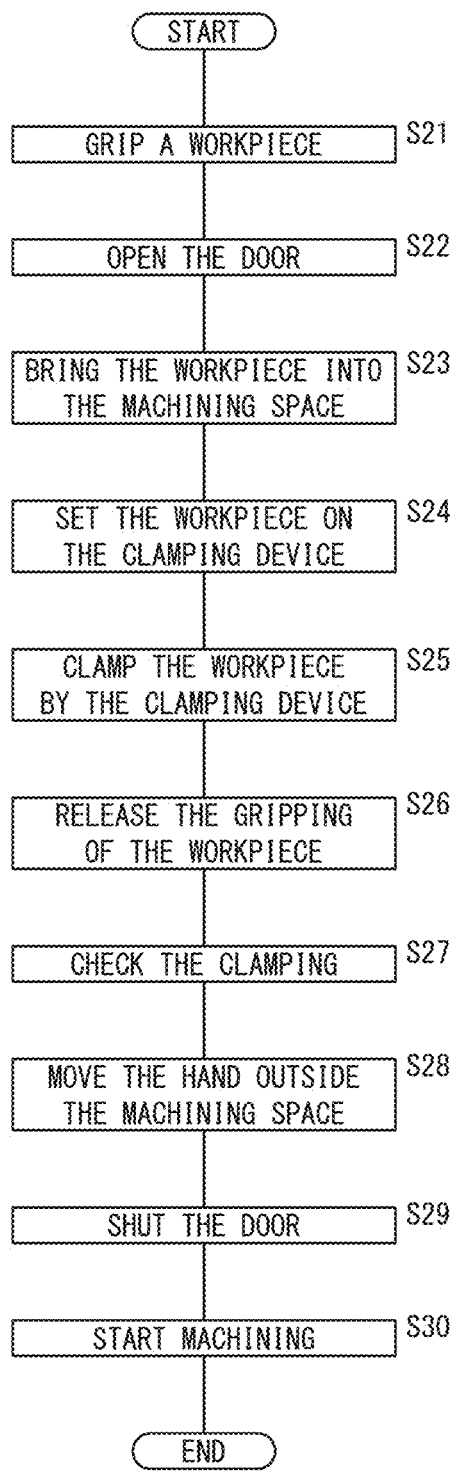
FIG. 5 is a flowchart explaining the operations from the loading of a workpiece into a machining space to the start of machining when a conventional robot arranged outside the machining space is used.

Herein, in order to compare the present embodiment with the conventional art, the operation of loading and unloading the workpiece W using a conventional robot (hereinafter referred to as the prior art robot) arranged outside the machining space 12a will be explained. First, the operation of the machine tool 12 and the prior art robot from the loading of the workpiece W into the machining space 12a until the start of machining will be described with reference to the flowchart shown in FIG. 5.

At step S21, the prior art robot arranged outside the machining space 12a grips a blank workpiece W placed on the workpiece support table arranged outside the machining space 12a with the hand 54.

Next, at step S22, the machine tool 12 opens the door 48a so as to enable the workpiece W to be loaded into the machining space 12a. As a result, the opening of the splash guard 48 is exposed.

Next, at step S23, the prior art robot brings the gripped workpiece W through the opening in the splash guard 48 into the machining space 12a, and at step S24, sets the workpiece W on the clamping device attached to the table 28.

Then, at step S25 the clamping device clamps (holds and fixes) the workpiece W. At step S26, the prior art robot releases the gripping of the workpiece W. Subsequently, at step S27 the machine tool 12 confirms that the workpiece W has been properly clamped. The clamped state is confirmed using a sensor or the like provided for the clamp device.

When confirmation of clamping has been done, the prior art robot moves the hand 54 out of the machining space 12a through the exposed opening at step S28, the machine tool 12 closes the door 48a at step S29, and the machine tool 12 starts machining at step S30.

Next, the operation of the machine tool 12 and the prior art robot from the completion of machining until the unloading of the workpiece W to the outside of the machining space 12a will be described with reference to the flowchart shown in FIG. 6.

Upon completion of the machining, at step S31 the machine tool 12 opens the door 48a so as to enable the workpiece W to be unloaded from the machining space 12a.

Then, at step S32 the prior art robot moves the hand 54 into the machining space 12a through the opening in the splash guard 48. At step S33, the prior art robot grips the workpiece W placed on the clamping device. At the next step S34, the clamping device releases the clamping of the workpiece W.

Subsequently at step S35, the prior art robot brings the gripped workpiece W out of the machining space 12a through the opening in the splash guard 48. At step S36, the machine tool 12 shuts the door 48a.

Next, at step S37, the prior art robot places the gripped workpiece W on the workpiece support table and releases the gripping of the workpiece W at step S38.

As can be seen, the conventional configuration needs clamping, the confirmation of clamping, and the unclamping of the workpiece W with the clamping device, hence the time of the machining cycle becomes long.

VARIATIONAL EXAMPLES

The above embodiment may be modified as follows.

Variational Example 1

In the above embodiment, though the workpiece W is clamped by the robot 14, there occur cases in which it becomes difficult for the robot 14 to accurately clamp the workpiece W due to excessive machining torque or excessive cutting speed. As a countermeasure against such a situation, in variational example 1, a vibration detector 56 for detecting vibration may be provided for the robot 14 (see FIG. 2). The vibration detector 56 is to detect the vibration caused by the machining of the workpiece W with the tool 22. The machine tool 12 (specifically, the control device 16) may be configured to change at least one of the machining torque and the cutting feed speed of the tool 22 in accordance with the vibration detected by the vibration detector 56. For example, when the detected level of vibration is equal to or greater than a threshold, the machine tool 12 reduces the machining torque or slows down the cutting feed speed in order to suppress the vibration during machining below the threshold.

Variational Example 2

Though in the above embodiment the robot 14 is adapted to load, place, clamp, and unload the workpiece W, a transport device may be provided to carry in and out the workpiece W. That is, the transport device may load a blank workpiece W into the machining space 12a and unload the machined workpiece W to the outside of the machining space 12a. In this case, the robot 14 grips the blank workpiece W brought in by the transport device, places the blank workpiece W on the table 28, and hands over the machined object W to the transport device.

[Technical Idea Obtained from the Embodiment]

Technical ideas that can be grasped from the above embodiment and variational examples 1 and 2 will be described hereinbelow.

A machine tool system (10) includes: a machine tool (12) configured to machine a workpiece (W) set on a table (28)

using a tool (22) attached to a spindle (20); and a robot (14) configured to grip the workpiece (W). The robot (14) is installed on the table (28) and configured to perform a setting operation for setting the workpiece (W) on the table (28) and a clamping operation for clamping the workpiece (W).

Accordingly, no clamping device is needed. Therefore, it is no longer necessary to perform a clamping operation with a clamping device and to check the clamped state, whereby it is possible to shorten the machining cycle time. Further, since there is no need to provide a clamp device, no unclamping operation is needed. Furthermore, even if the table (28) is moved, the clamping accuracy of the workpiece (W) will not deteriorate. Since the robot (14) is installed in the machining space, there is no need to provide a safety fence surrounding the robot (14), whereby the cost is reduced.

The machine tool (12) is configured to machine the workpiece (W) according to a predetermined program, and the robot (14) is configured to clamp the workpiece (W) so that a site on the workpiece (W) at which the workpiece (W) is machined will not deviate from the machining position determined by the program. Thereby, the machine tool (12) can machine the workpiece properly.

The robot (14) is configured to clamp the workpiece (W) so that the workpiece (W) will not move relative to the table (28) during machining. As a result, the machine tool (12) can machine the workpiece properly.

The robot (14) is configured to perform a loading operation of bringing the workpiece (W) into a machining space (12a) of the machine tool (12) and an unloading operation of taking the machined workpiece (W) out of the machining space (12a). As a result, since the robot (14) performs a series of operations of loading, placing, clamping, and unloading the workpiece (W), the time of the machining cycle can be further shortened.

The robot (14) may include a vibration detector (56) configured to detect vibration. The machine tool (12) may be configured to change at least one of the machining torque and the cutting feed speed of the tool (22) based on the vibration detected by the vibration detector (56). Thereby, the robot 14 can clamp the workpiece W with high accuracy.

The specific configuration of the invention is not limited to the embodiments above, but changes in design and the like without departing from the gist of the present invention should also be included in the present invention.

What is claimed is:

1. A machine tool system comprising:
    a machine tool configured to machine a workpiece set on a table using a tool attached to a spindle; and
    a robot configured to grip the workpiece,
    wherein the robot is installed on the table and configured to perform a setting operation for setting the workpiece on the table and a clamping operation for clamping the workpiece with a hand of the robot so that the workpiece does not move relative to the table during machining.

2. The machine tool system according to claim 1, wherein:
    the machine tool is configured to machine the workpiece according to a predetermined program; and
    the robot is configured to clamp the workpiece so that a site of the workpiece at which the workpiece is machined does not deviate from a machining position determined by the program.

3. The machine tool system according to claim 1, wherein the robot is configured to clamp the workpiece so that the workpiece does not move relative to the table during machining.

4. The machine tool system according to claim 1, wherein the robot is configured to perform a loading operation of bringing the workpiece into a machining space of the machine tool and an unloading operation of taking the machined workpiece out of the machining space.

5. The machine tool system according to claim 1, wherein:
    the robot includes a vibration detector configured to detect vibrations; and
    the machine tool is configured to change at least one of a machining torque and a cutting feed speed of the tool based on the vibrations detected by the vibration detector.

6. A clamping method for clamping a workpiece on a table of a machine tool machining the workpiece with a tool attached to a spindle, comprising the steps of:
    installing on the table a robot that grips the workpiece;
    performing a setting operation of setting the workpiece on the table with the robot; and
    performing a clamping operation of clamping the workpiece with a hand of the robot.

7. The clamping method according to claim 6, wherein:
    the machine tool machines the workpiece according to a predetermined program; and
    the robot clamps the workpiece so that a site of the workpiece at which the workpiece is machined does not deviate from a machining position determined by the program.

8. The clamping method according to claim 6, wherein the robot clamps the workpiece so that the workpiece does not move relative to the table during machining.

9. The clamping method according to claim 6, wherein the robot performs a loading operation of bringing the workpiece into a machining space of the machine tool and an unloading operation of taking the machined workpiece out of the machining space.

10. The clamping method according to claim 6, wherein:
    a vibration detector provided for the robot detects vibrations; and
    the machine tool changes at least one of a machining torque and a cutting feed speed of the tool based on the detected vibrations.

* * * * *